(12) United States Patent
Schlief

(10) Patent No.: US 6,982,840 B1
(45) Date of Patent: Jan. 3, 2006

(54) MAGNIFIER AND GLASSES

(76) Inventor: John Schlief, 94 Mattabasset Dr., Durham, CT (US) 06422

( * ) Notice: Subject to any disclaimer, the term of this patent is extended or adjusted under 35 U.S.C. 154(b) by 40 days.

(21) Appl. No.: 10/772,755

(22) Filed: Feb. 5, 2004

Related U.S. Application Data

(60) Provisional application No. 60/445,220, filed on Feb. 5, 2003.

(51) Int. Cl.
  *G02B 27/02* (2006.01)
  *G02B 7/02* (2006.01)
  *G02C 11/02* (2006.01)

(52) U.S. Cl. ............ 359/802; 359/798; 359/808; 351/51; 351/115

(58) Field of Classification Search ........... 359/802, 359/798, 808, 807, 809; 351/54, 115, 124
See application file for complete search history.

(56) References Cited

U.S. PATENT DOCUMENTS

| | | | |
|---|---|---|---|
| 2,285,615 A | * | 6/1942 | Ruchser .................. 351/54 |
| 3,140,883 A | | 7/1964 | Anthony .................. 281/34 |
| 4,950,057 A | * | 8/1990 | Shirayanagi ............. 351/169 |
| D314,009 S | | 1/1991 | Boitani |
| 5,333,907 A | | 8/1994 | Schaeffer ................ 281/42 |
| 5,680,193 A | * | 10/1997 | Epstein .................. 351/55 |
| 6,249,390 B1 | | 6/2001 | Thibodeaux, Jr. .......... 359/802 |
| 6,623,669 B1 | * | 9/2003 | Slack et al. .............. 264/2.5 |

FOREIGN PATENT DOCUMENTS

JP 10-181750 * 7/1998

OTHER PUBLICATIONS

"Patented Sight Sheet Magnifiers", by V. B. Schaeffer, Inc. Pittsburgh PA, copyright 1998, pags 3&4.

* cited by examiner

*Primary Examiner*—Timothy Thompson
(74) *Attorney, Agent, or Firm*—John H. Crozier

(57) ABSTRACT

In a preferred embodiment, a magnifier for a menu or the like, including: the magnifier and the menu or the like; and the magnifier being disposed in a pocket associated with the menu or the like. A pair of glasses that has both upper and lower lenses of different strengths is also provided.

17 Claims, 2 Drawing Sheets

MAGNIFIER AND GLASSES

CROSS-REFERENCE TO RELATED APPLICATION

The present invention claims the benefit of the filing date of U.S. Provisional Application No. 60/445,220, filed Feb. 5, 2003, and titled MAGNIFIER AND GLASSES.

BACKGROUND OF THE INVENTION

1. Field of the Invention

The present invention relates to menus and the like generally and, more particularly, but not by way of limitation, to a novel magnifier for menus and the like.

2. Background Art

Whether due to poor lighting and/or due to poor eyesight, menus, wine lists, the meal check, and the like can be hard to read. Oftentimes, to not call attention to the fact that the item cannot be read, a person simply fails to adequately read the item or the person ignores it entirely.

Also, drugstores and the like often sell reading glasses. A person picks out a strength that suits that person and buys the reading glasses. To cover a range of strengths, the seller of the reading glasses must inventory a wide selection of strengths.

Accordingly, it is a principal object of the present invention to provide means for reading a menu or the like that compensates for poor lighting and/or poor eyesight and that improves the readability of the menu or the like.

A further object of the invention is to provide such means that is discreet.

An additional object of the invention is to provide such means that can be used with an existing menu or the like.

Another object of the invention is to provide such means that can be easily and economically implemented.

Yet a further object of the invention is to reduce the inventory a seller of reading glasses must have.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a magnifier for a menu or the like, comprising: said magnifier and said menu or the like; and said magnifier being disposed in a pocket associated with said menu or the like. A pair of glasses that has both upper and lower lenses of different strengths is also provided.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which:

FIG. 2 is a front elevational view of a magnifier in a sleeve that allows the addition to a page that does not interfere with the normal reading of a menu or the like.

FIG. 3 is a front elevational view of a magnifier in a sleeve that is punched to match up with holes in an existing menu or the like.

FIG. 4 is a front elevational view of a magnifier in a sleeve that is added to a menu or the like at the time of manufacture of the menu or the like.

FIG. 5 is a side elevational view of a magnifier in a sleeve that is clipped to a menu or the like.

DETAILED DESCRIPTION OF THE PREFERRED EMBODIMENTS

Figure 1:
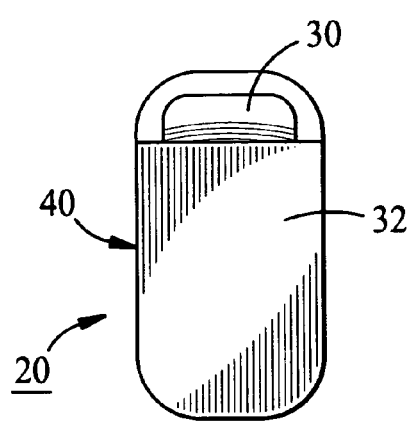
FIG. 1 is a front elevational view of a magnifier and sleeve with self-sticking backing.

Reference should now be made to the drawing figures on which similar or identical elements are given consistent identifying numerals throughout the various figures thereof, and on which parenthetical references to figure numbers, when used, direct the reader to the view(s) on which the element(s) being described is (are) best seen, although the element(s) may be seen on other figures also.

FIG. 1 illustrates the basic embodiment of the present invention, the device generally indicated by the reference numeral 20. Device 20 includes a magnifier 30 removably inserted in a sleeve or pocket 32. Sleeve or pocket 32 has a self-sticking coating 40 applied to the back thereof such that sleeve or pocket 32 can be applied to a menu page, menu cover, or the like.

Figure 2:
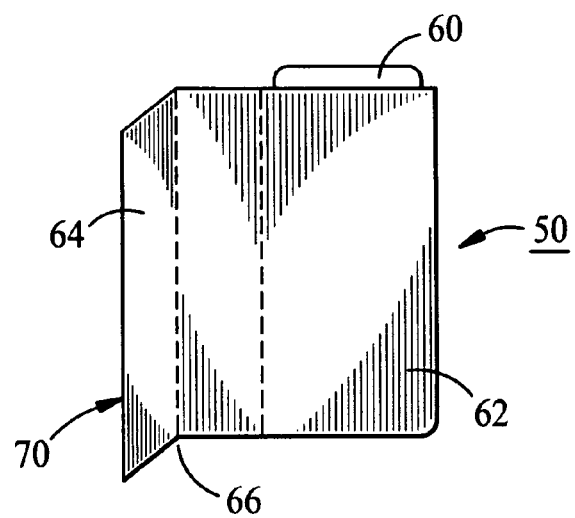

FIG. 2 illustrates another embodiment of the present invention, here a device 50 that does not interfere with the normal reading of a menu or the like. Device 50 includes a magnifier 60 removably disposed in a sleeve or pocket 62, which may be clear, the sleeve or pocket having a tab extension 64 attached thereto by means of a flexible hinge 66. Tab extension 64 has a self-sticking material 70 disposed on the rear surface thereof. Tab extension 64 may instead be disposed on the other edge of sleeve or pocket 62.

Figure 3:
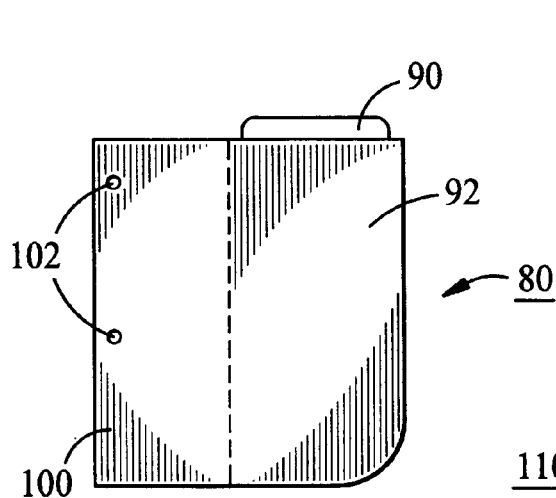

FIG. 3 illustrates a further embodiment of the present invention, here a device 80 that includes a magnifier 90 removably disposed in a sleeve or pocket 92. Sleeve or pocket 92 includes a tab extension 100 that has defined therethrough holes 102 for attachment of the sleeve or pocket to an existing menu or the like.

Figure 4:
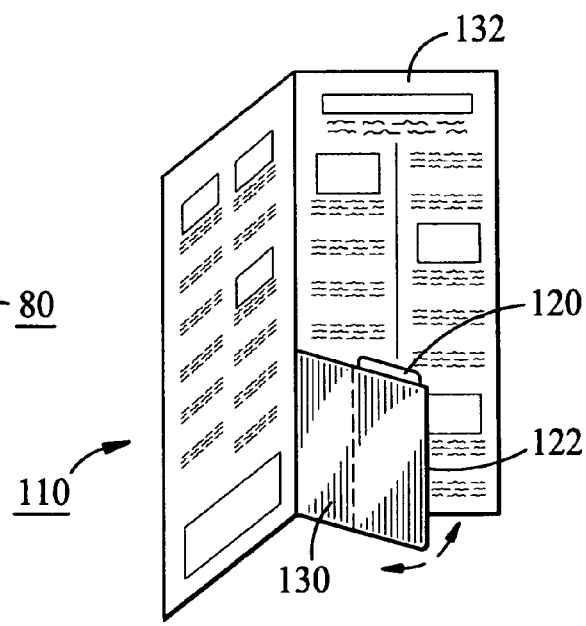

FIG. 4 illustrates an additional embodiment of the present invention, here a device 110 that includes a magnifier 120 removably disposed in a sleeve or pocket 122, which may be clear. Sleeve or pocket 122 includes a tab extension 130 that may be bound into a menu or the like 132 at the time of manufacture of the menu or the like.

Figure 5:
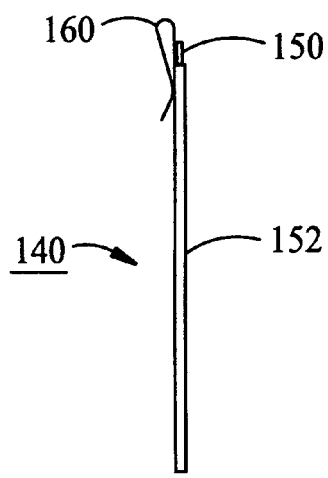

FIG. 5 illustrates yet another embodiment of the present invention, here a device 140 that includes a magnifier 150 removably disposed in a sleeve or pocket 152. Fixedly attached to sleeve or pocket 152 is a spring clip 160 for the removable attachment of the sleeve or pocket to a menu or the like.

Figure 6:
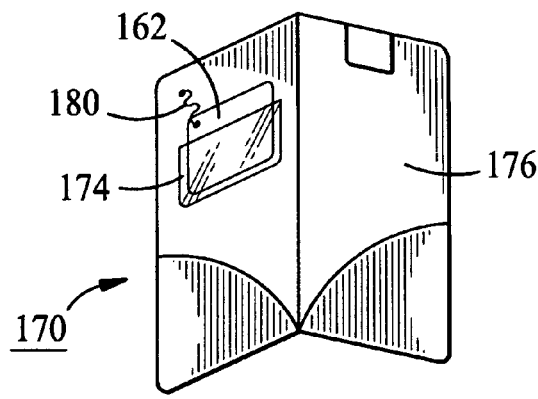
FIG. 6 is a front elevational view of a magnifier in a sleeve in a check presenter, with a cord attached to the magnifier and to the check presenter.

FIG. 6 illustrates yet a further embodiment of the present invention, here a device 170 that includes a magnifier 162 removably disposed in a partial pocket 174 in a check presenter 176. Check presenter 176 includes a retractable cord 180 that is attached to the check presenter and to magnifier 162 to prevent removal of the magnifier from the check presenter.

Figure 7:
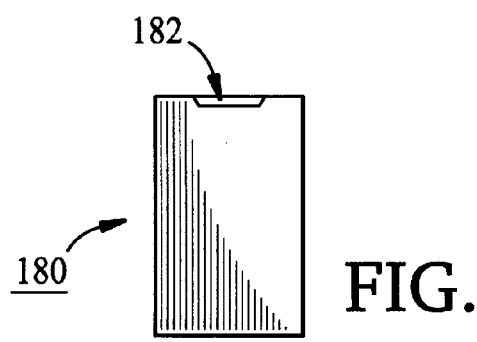
FIG. 7 is a front elevational view of a menu or the like that has a slot defined therein for the insertion of a magnifier.

FIG. 7 illustrates yet an additional embodiment of the present invention, here a menu or the like, generally indicated by the reference numeral 180, having a slot 182 defined therein for the insertion of a magnifier (not shown).

Figure 8:
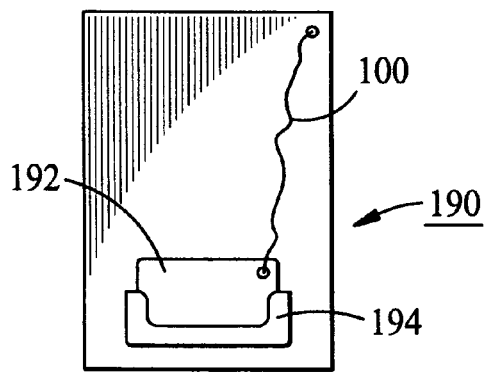
FIG. 8 is a front elevational view of a magnifier in a surface mount retainer attached to a menu or the like and having a cord attached thereto.

FIG. 8 illustrates an alternative embodiment of the present invention, here a device 190 having a magnifier 192 disposed in a surface mount retainer 194. Also shown on FIG. 8 is a cord 100 fixedly attached to the device 190 and to the magnifier 192 to prevent removal of the magnifier.

In addition to the mounting means illustrated above, other mounting means are within the contemplation of the present invention. Such other mounting means include hook-and-loop fabric and string, for example. It will also be understood that the size and shape of the magnifier and the sleeve or pocket in which it is disposed may be varied, depending on the use to which the device is to be put. It will further be understood that the magnifier of the present invention, in addition to being adapted to be attached to and/or inserted in all types of menus and check presenters can also be employed in any situation in which ready access to magnifying means is desired. A light may be associated with the magnifier as an additional aid to the vision of a user.

Figure 9:
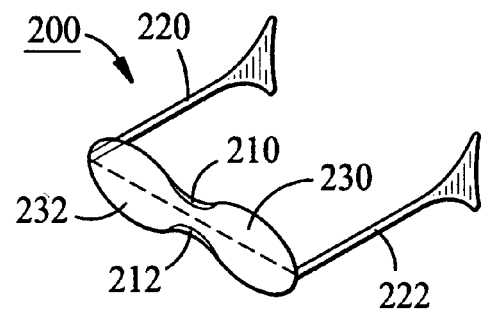
FIG. 9 is a front/top/side isometric view of a pair of glasses in an "over/under configuration.

FIG. 9 illustrates a pair of glasses generally indicated by the reference numeral 200. Glasses 200 are in an "over/under" configuration having nose bridges 210 and 212 on the top and bottom of the glasses. Glasses 200 are symmetrical and have straight temple pieces 220 and 222 so that the glasses can be worn with either nose bridge 210 or nose bridge 212 contacting the nose of the person wearing the glasses. This configuration allows a weak/average diopter for, say, one half 230 of the lenses of glasses 200 and a medium/strong diopter for, say the other half 232 of the lenses. This configuration permits the seller of glasses to stock at least one half the number of glasses that otherwise would be stocked and, perhaps, considerably fewer than one half the number.

Additionally, this may permit a seller to stock only one pair that may provide an option for someone needing an emergency or temporary pair of reading glasses. A person who requires reading lenses generally has a range of focus within 0.75 diopters of his or her prescribed glasses that is adjustable by a changing the reading distance. Using this formula suggests that a combination lens of 1.25 diopters and 2.75 diopters would allow a range of correction from less than 1.0 diopter to over 3.0 diopters. In essence, this design provides for a "universal" pair of reading glasses that could provided reasonable vision correction to nearly anyone suffering from presbyopia or other vision condition that requires glasses for near vision improvement. This is a design that is in stark contrast to reading glasses and bifocals whose purpose is to correct only a particular vision condition.

The use of lenses with strengths of 1.25 and 1.75 diopters may be a proper combination for a "universal eyeglass"; however, if a person normally required a 1.0 diopter lens for reading, the lens combination might be chosen as a 1.0 diopter upper and a 2.0 diopter lower combination, the latter for enhancing near vision. For a person who may require a lens strength of 2.5 diopters for reading, a choice may be a second lens of 3.5 or 3.75 diopters. The main point is that the strengths of the lenses could be chosen for suitability for the task at hand and that the dual nose bridge would provide extra versatility over glasses with only one nose bridge.

For example, person who is using a device such as a sewing machine may wish to have the weaker power lens on the lower positions while sewing, and only to glance through the upper (higher power) lens to get a better look when threading a needle. A coin collector may wish to use the glasses with the higher power disposed in the lower position to examine coins only to glance through the upper lens to check the listing in a book. This configuration is changed by only a 180-degree rotation of these glasses, and provides the hobbyist a versatile reading instrument that can be useful in a plurality of situations.

Also, an eyeglass retailer could provide a customer with a set of these glasses, perhaps a 1.25 and 1.75 diopter combination, for a trial period to determine comfort, whereas, the final lens would be manufactured after this trial.

The temples of these glasses offer several suitable options. Option one is a simple straight temple. Option two is a temple that has small ear catches disposed on both the lower and upper sides, as shown on FIG. 9, that provide a means to support the glasses when worn either over or under. A final option allows the temple to be rotated along its axis as the glasses are flipped from one position to the other.

Another feature of these glasses is the use of standard optics, as well as a fresnel lens configuration. The fresnel lens configuration provides a means to manufacture a very thin universal glass, with a total overall thickness of ⅛ of an inch while being extremely cost effective to produce. Also, multi-focal or progressive optics may be employed to further enhance the usability of the glasses.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A magnifier for a menu or the like, comprising:
   (a) said magnifier and said menu or the like;
   (b) said magnifier being disposed in a pocket part of said menu or the like; and
   (c) said magnifier is accessible through a slot defined in said menu or the like.

2. A magnifier for a menu or the like, as defined in claim 1, wherein: said pocket has an adhesive coated surface for attachment to said menu or the like.

3. A magnifier for a menu or the like, as defined in claim 1, wherein: said pocket has a tab extension and said tab extension has an adhesive coated thereon for attachment to said menu or the like.

4. A magnifier for a menu or the like, as defined in claim 1, wherein: said pocket has a tab extension with a plurality of holes punched therethrough for attachment to an existing menu or the like.

5. A magnifier for a menu or the like, as defined in claim 1, wherein: said pocket has a tab extension that can be bound into said menu or the like at the time of manufacture of said menu or the like.

6. A magnifier for a menu or the like, as defined in claim 1, wherein: said pocket has a spring clip fixedly attached thereto for the removable attachment of said pocket to said menu or the like.

7. A magnifier for a menu or the like, as defined in claim 1, wherein: said menu or the like is a check presenter and said magnifier is disposed in a pocket that is part of said check presenter.

8. A magnifier for a menu or the like, as defined in claim 7, wherein: said magnifier has a retractable cord attached to said magnifier and to said check presenter.

9. A magnifier for a menu or the like, as defined in claim 1, wherein: said magnifier is disposed in a pocket that is part of the menu or the like and a cord is attached to said magnifier and to said menu or the like.

10. A pair of glasses, comprising:
    (a) two temple pieces;
    (b) said pair of glasses being divided into upper and lower lenses along an imaginary line generally disposed between said temple pieces;
    (c) said upper and lower lenses being of different optical strengths;
    (d) two nose pieces disposed generally centrally of said lenses and at distal edges thereof; and
    (e) said two temple pieces have two ear catches defined at upper and lower edges of distal ends thereof to partially support said pair of glasses on ears of a wearer of said pair of glasses.

11. A pair of glasses, as defined in claim 10, wherein: said upper and lower lenses have different optical strengths.

12. A pair of glasses, as defined in claim 11, wherein: one of said upper and lower lenses has a diopter strength of about 1.25 and another of said upper and lower lenses has a diopter strength of about 2.75 diopters.

13. A pair of glasses, as defined in claim 10, wherein: said upper and lower lenses are formed using standard eyeglass optics.

14. A pair of glasses, as defined in claim 10, wherein: said upper and lower lenses are formed using a fresnel lens configuration.

15. A pair of glasses as defined in claim 10, wherein: said upper and lower lenses are formed using multi-focal or progressive optics.

16. A pair of glasses, as defined in claim 10, wherein: said two temple pieces are straight.

17. A pair of glasses, as defined in claim 10, wherein: said two temple pieces can be rotated 180-degrees.

* * * * *

UNITED STATES PATENT AND TRADEMARK OFFICE
CERTIFICATE OF CORRECTION

PATENT NO. : 6,982,840 B1 Page 1 of 1
APPLICATION NO. : 10/772755
DATED : January 3, 2006
INVENTOR(S) : John Schleif It is certified that error appears in the above-identified patent and that said Letters Patent is hereby corrected as shown below:

Please insert item [75]
The inventor is --John Schleif--.

Signed and Sealed this

Third Day of October, 2006

JON W. DUDAS
*Director of the United States Patent and Trademark Office*